United States Patent Office 3,437,803
Patented Apr. 8, 1969

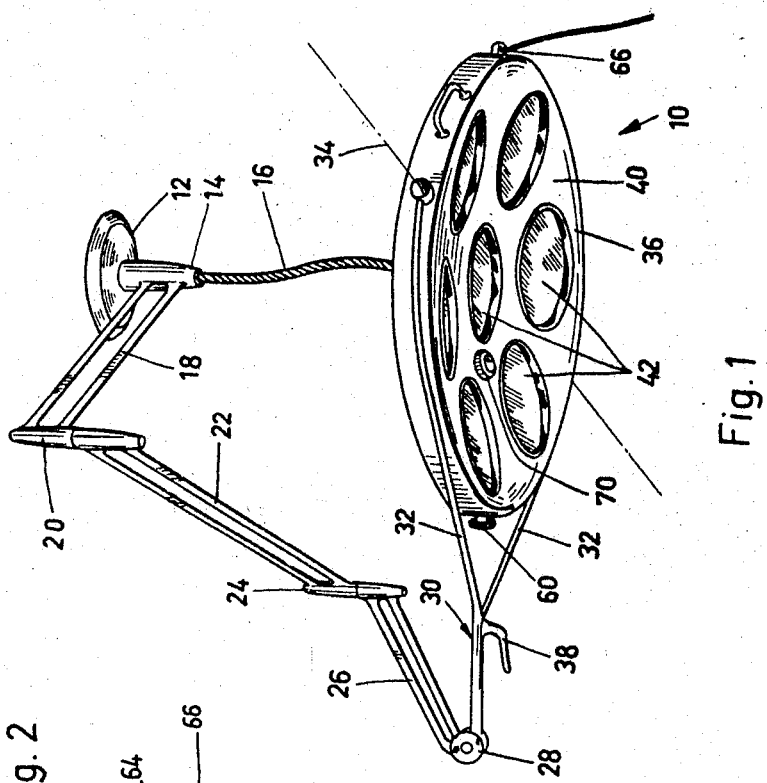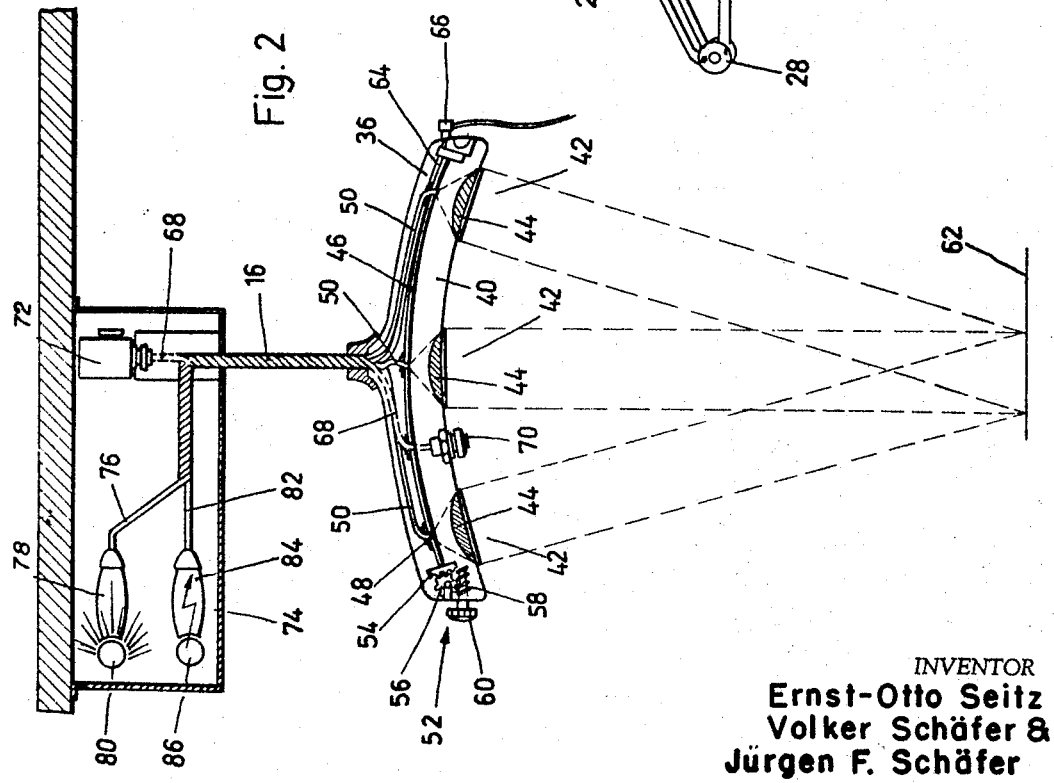

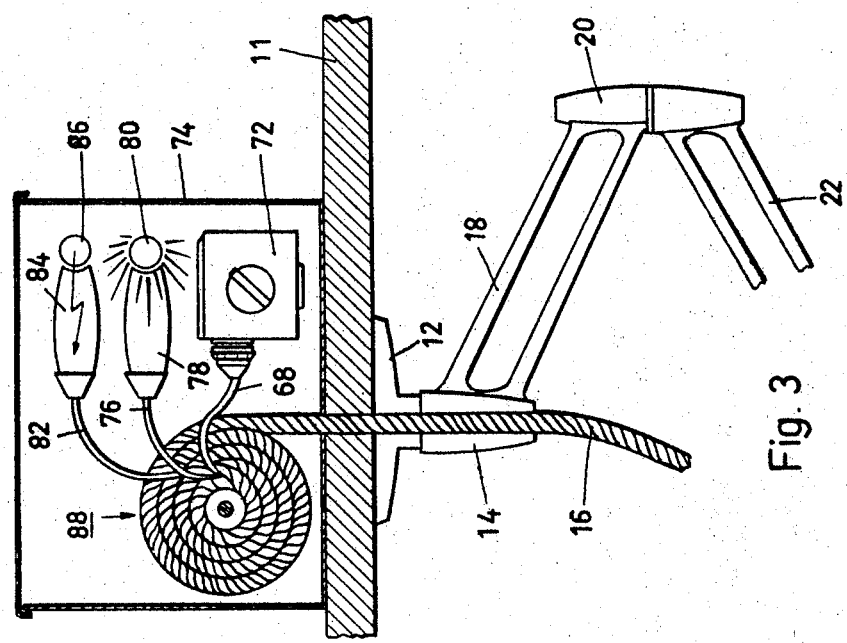
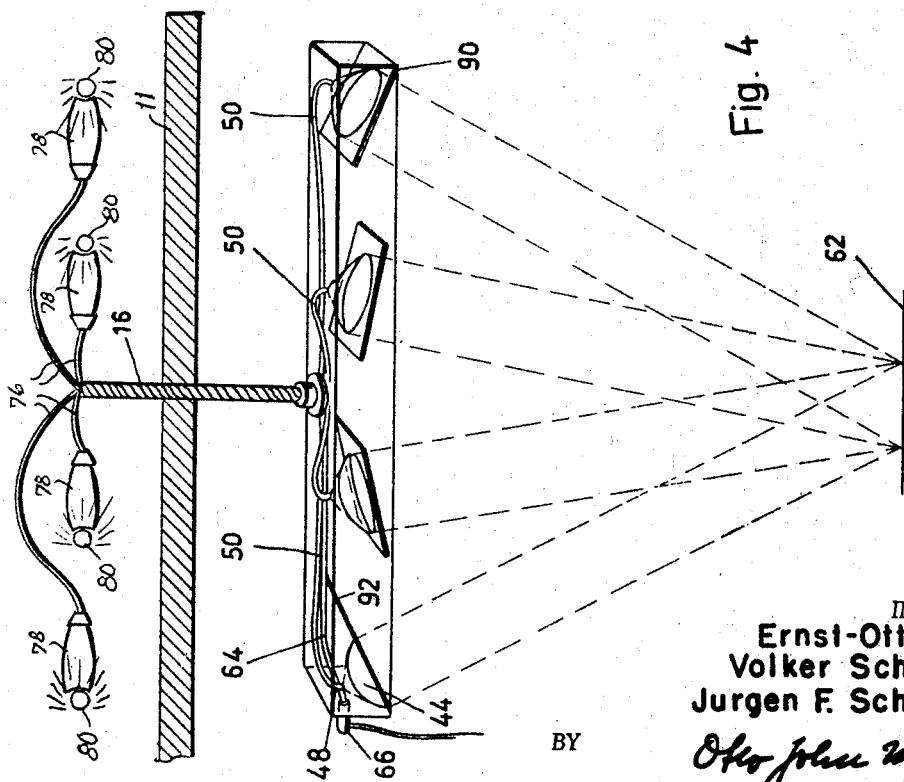

3,437,803
SURGICAL COLD LIGHT ILLUMINATING APPARATUS
Ernst-Otto Seitz, Hanau, Volker Schafer, Bruchkobel B., Hanau, and Juergen F. Schafer, Gelnhausen, Germany, assignors to Quarzlampen Gesellschaft m.b.H., Hanau am Main, Germany
Original application Apr. 5, 1965, Ser. No. 445,530, now Patent No. 3,360,640, dated Dec. 26, 1968. Divided and this application Oct. 26, 1967, Ser. No. 678,316
Claims priority, application Germany, Apr. 11, 1964, Q 783
Int. Cl. F21v 33/00; A61g 13/00
U.S. Cl. 240—1.4
9 Claims

ABSTRACT OF THE DISCLOSURE

A surgical illuminating apparatus employing one or more sources of light and one or more fiberglass light conducting bundles arranged to conduct light from the source or sources to lenses suspended over a work area and to one or more sockets or connectors adapted to receive and impart light to flexible light conducting bundles which pass light on to instruments, cap lamps, hand-lamps, etc. The sockets or connectors are mounted on the lens support.

Cross-reference to related application

This is a division of copending U.S. patent application Ser. No. 445,530, filed Apr. 5, 1965; the filing date of which is claimed for all subject matter claimed herein.

Background of the invention

The present invention is directed to illuminating apparatus for surgical and similar purposes, including portable lamps and illuminated instruments which avoid the usual disadvantages of weight, heat, and explosion hazard.

Summary of the invention

A primary object of the present invention is to provide surgical illuminating apparatus in which a light radiator array is movably suspended over the operating area, said array comprising several spaced light radiators, and light weight, cool, spark free illuminated instruments, cap lamps, hand lamps, etc., are made available. At least one common source is provided for said radiators in a remotely located explosion-proof housing, the light source and the outlet radiators being interconnected by one or more flexible light conduits.

Another object of the invention is to provide such surgical illuminating apparatus wherein the light conduits, or at least some of them, if a plurality of them is employed, comprises thin glass fibers in bundles which terminate at the illuminating array in converging lenses which serve as the light radiators.

Still another object of the invention is to mount the ends of said fiberglass bundles adjustably with respect to said converging lenses.

Another object of the invention is to eliminate the disturbing heat of the conventional surgical illuminating apparatus during operations.

Yet another object of the invention is to provide apparatus of the type mentioned in combination with a camera.

Brief description of the drawings

Other objects and many of the attendant advantages of this invention will become apparent to those skilled in the art from the following description and accompanying drawings, in which:

FIGURE 1 is a perspective view of surgical illuminating apparatus in accordance with the present invention;

FIGURE 2 is a view, partly in cross section, of an apparatus similar to that of FIGURE 1;

FIGURE 3 is a schematic cross-sectional view of the arrangement of a light-source housing mounted on top of a ceiling of an operating room;

FIGURE 4 is a schematic illustration of a modified embodiment of a radiator array and mounting.

Like reference characters define the same or similar parts throughout the specification and drawings.

Description of the preferred embodiments

The surgical illuminating means of the invention have a simple construction, good protection from dust, and versatile applicability, due to the use of several light radiators positioned in a mounting at a distance from each other. Thus, freedom from shadows and stereoscopic vision are assured in the illuminated area or region.

The present invention overcomes the disadvantages of conventional surgical lamps or lights.

The conventional luminaire contains all the elements necessary for the conversion of electrical energy into light. A single floodlight with incandescent lamp, or other light source, heat-insulating filters, reflectors, and a corresponding suspension is provided behind each light outlet. For this reason, the body of the conventional apparatus is heavy, large in diameter, and produces heat which radiates on the surgeon. The heavy light body made with a stable rigid suspension formed by hinged or articulated brackets is hard to manipulate. The heat which is produced by the lamps may cause danger of an explosion of the anesthetics used.

In order to eliminate the disadvantages of the prior art, the surgical illuminating apparatus in accordance with the present invention is so designed and arranged that at least one light source common to all of the light-emissive outlets or radiators is present and is accommodated in an explosion-proof housing which is separated from the radiator mounting of the illuminating apparatus and connected with radiators by way of at least one flexible light conductor.

Advantageously, the conversion of the electrical energy into light no longer takes place in the suspended radiator mounting. Therefore, the inevitable formation of heat at the light source has no disturbing effects on either the patient or the surgeon, nor can it produce the danger of an explosion of anesthetic gases, since the remote lamp housing may be better sealed off than the radiator mounting. The present invention renders it possible to employ as the light source particularly strong high-powered incandescent lamps or other type discharge lamps which, despite their excellent light yield could not be used heretofore in the illumination of operating rooms because of the excessive formation of heat. The radiator mounting and array may be made light, whereby the suspension requirements are relieved. Also, no large forces are then needed for the adjusting movements. The radiator array and mounting may also be kept small in overall dimensions. This reduces or eliminates the psychological stresses on the surgeon who usually felt oppressed heretofore by the large light body hanging directly over the operating area. While the illuminating head including the radiator array and mounting is kept completely maintenance-free, any inspection work on the lamp housing, or exchange of lamps, may be carried out in a simple manner because the lamp housing is separated from the illuminating head.

In prior art a flexible light conductor described here as a connection between the lamp housing and the illuminating head has not been employed for extended area illumination purposes, but rather in endoscopes and the like.

The recognition and solution of the existing problems as to a large area, shadow-free illumination by surgical lamps permits stereoscopic vision by the consistent use of flexible light-conveying means.

The flexible light-conveying means of the present invention advantageously utilize thin fiberglass bundles which terminate in the illuminating head, in each case in the focal point of a converging lens which serves as a radiator. The fiberglass bundle ends are almost ideal pinpoint light sources with a predetermined direction of reflection and are directed toward the the respective converging lenses. The conventionally required reflectors become superfluous and the light rays emitted by the converging lenses is substantially collimated. Moreover, there is no need for the provision of any heat-protective or heat-insulating means in the illuminating head apparatus since the generation of heat takes place advantageously in the remote lamp housing. The ends of the fiber glass bundles in the illuminating head may be made adjustable with respect to the converging lenses so that the extent of the area to be illuminated may be varied in a simple manner.

One fiber glass bundle in the illuminating head may be branched off from the flexible light-conductor and passed to the wall of the illuminating apparatus where it ends as a light socket. Additional lamps, illuminated or luminous instruments, or endoscopes may be connected to this light socket with the aid of further light-conveying means and may also be supplied in this manner from the light source of the illuminating head. A neurosurgeon may connect, for example, a cap lamp operated with a flexible light-conveying means to a light socket provided in this manner. Several light sockets may, of course, be provided without difficulties for simultaneously connecting several apparatus or instruments.

An improved utilization of the new surgical illuminating apparatus is effected by connecting with the flexible light conductor a flexible image conductor or image-conveying means which extends from an objective positioned in the surgical illuminating apparatus in the direction of reflection to a camera which is disposed in or at the separate lamp housing. The camera may be a photographic camera, a movie camera or a television scanner such as an iconoscope system. The demands for the connection of surgical illuminating apparatus to such cameras are constantly increasing. The installation or reconstruction of such scanners produced difficulties heretofore. In the multilamp operating light systems one of the floodlights had to be sacrificed generally to provide space for the installation of a camera. Particularly expensive is the light combination with a frequently desired color television camera. With the aid of the present invention this requirement may be satisfied easily and at any time because it removes the obstacles thereto, which were inherent in the light sources of the prior art. The cause of the heretofore prevailing difficulties of installation, i.e., the dimensions of the camera and the sensitivity toward heat, may be readily controlled because of the separation of the light source from the newly introduced light guide.

The separate lamp housing may be accommodated either within or outside of the operating room. When accommodating it within the operating room the installation will expediently be chosen in proximity to the attachment at the ceiling, and when arranging it above the operating room, the place selected will be directly above the attachment of the illuminating apparatus.

In one embodiment the flexible light conductor extends into the lamp housing and the free portion thereof between the lamp housing and the body of the illuminating body is kept tight by way of a spring-loaded winding device.

One light source or, for safety reasons, several light sources, are provided within the lamp housing at the end of the light conductor. In addition to the illuminating light, a photo flash may be transmitted advantageously from a flashlight positioned in the light source housing to the operating area by way of the light conductor. A modified embodiment of the present invention uses the principle of the invention in an illuminating apparatus which has an elongated form of illuminating head corresponding to the shape, dimensions and spatial extension of the operating table. Several illuminated areas may be produced simultaneously, in this instance, in that the converging lenses and the respective fiberglass bundle ends form, in each case, units suspended on gimbals and adjustable either jointly or individually.

Referring now to FIGURE 1, a surgical illuminating head 10 is shown, suspended from a ceiling 11, utilizing articulated brackets according to conventional principles. Directly on the ceiling is mounted a ceiling attachment for the illuminating apparatus which is closed off by a cover plate 12. Arranged below the cover plate 12 is a first swivel link or joint 14 having a vertical axis of rotation. The swivel link or joint 14 is hollow and thus allows for a passage for a flexible light conductor 16 which extends from a light source in housing 13 positioned outside of the operating room above the ceiling, as shown in FIGURE 3, to the illuminating head 10. The light conductor 16 consists of a cable made up from glass fibers or bundles thereof.

The glass fibers are preferably of very fine diameter and carefully bundled in alignment for best output. They are made either flexible or inflexible in structure and as such produce flexible or inflexible bundles in alignment. These bundles may be made also partly flexible and partly inflexible, for instance in the embodiment of FIGURE 2; the lower portion of the bundles 16 may be made inflexible and may simultaneously serve as the sole support for the light reflector housing or optionally only the lowest portion thereof may be made flexible in order to permit steering control or manual deflection of the reflector housing. The light guide 88 of FIGURE 3 must be flexible at least for the length of the portion 88 which is to be coiled, and the end portion 16 of the light guide may be made flexible or inflexible as preferred. They are made preferably of glass or plastics, such as acrylates, methacrylates and others selected with the desired flexibility properties and with optimum light transparency and are preferably enclosed in a transparent envelope with the ends fused or potted and polished for optimum transparency. Each glass fiber is coated with a transparent material having a lower index of refraction than the materials of the fibers to aid the light to travel therethrough in a series of internal reflections from wall to wall. The bundle functions as a light guide, conduit, or conductor.

While one common light guide is shown in FIGURE 2 connecting a common light source to each light radiator by split fiberglass bundles, it is within the scope of this invention to provide a separate light source for each light radiator, each light source and light radiator, respectively, being connected by an independent glass fiber bundle.

Where a plurality of light sources is provided each one is connected to one light radiator, respectively, by an independent glass fiberbundle, the bundles preferably coiled as shown in the drawings.

Instead of coiling the fiberglass threads and the bundles, they may be woven into ropes or cables as is conventional in the particular arts of rope and cable manufacture.

While each individual glass fiber may be coated with the transparent material having a lower index of refraction, it lies within the scope of this invention to coat each bundle of coiled or woven fibers up to the point where they are joined into the common cables and then to coat the common rope or cable up to the point at which they branch off to a plurality of light radiators, when again each bundle is coated separately.

In this manner better distribution of the light from the source is achieved.

With the swivel link 14 is connected a first arm 18, preferably oriented horizontally and carrying at its other end a pivot joint 20. Adjacent the joint 20 are shown two preferably inclined arms 22 and 26 which are connected with one another by a pivot joint 24. In the embodiment shown, both the pivot joints 20 and 24 and the swivel link 14 have vertical axes of rotation. A swivel link 28 having a horizontal axis of rotation is provided at the lower end of an arm 26. The joint 28 supports an arm 30 which is pivotable about the longitudinal axis thereof and which carries a fork 32. The housing 36 of an illuminating head 10 is pivotally suspended about a transverse fork axis 34. The afore-described suspension of the surgical illuminating apparatus is different from the known suspensions in that all of the parts of the suspension are made considerably lighter than those of the known surgical lights of the prior art. This is possible because the housing 36 of the illuminating apparatus 10 is kept small and light while simultaneously rendering a better technical performance when compared to the conventional surgical lights. The body of illuminating apparatus is made either from a plastic material or from a light metal and structurally does not require special load bearing capacity for electrical assemblies, reflector bulbs, heat-protective filters and the like.

The housing 36 of the illuminating head is pivotable about the transverse fork axis 34. In order to permit pivoting about this axis during surgical operations without the necessity of reaching into the sterile area of the operation, a handle 38 is arranged at the arm 30 in the manner shown and with the aid thereof the housing 36 of the illuminating head may be moved either manually, by a guide stick or by way of a cable (not shown) running through or along the arms of fork 32.

In the downward direction, the housing 36 of the illuminating head ends in an approximately circular spherical shell segment 40. The radius of the spherical shell is so chosen that the center thereof will be positioned and approximately in the plane of the operating table. Several light radiators or outlets 42 are embedded in the spherical shell 40. These radiators or outlets preferably are equipped with lenses. The number and arrangement of the light outlets 42 corresponds to the arrangement and number of single or individual floodlights in the conventional operating or surgical lamps. For example, either four or six light radiators may be disposed at the edge and a further radiator may be provided in the center. Any other desired number or distribution, however, is possible. But as compared to conventional surgical lamps, the light outlets 42 need less space within the body 36 of the illuminating head than the individual floodlights of conventional surgical lights. For example, floodlights provided with incandescent lamps are superfluous. Moreover, it is no longer necessary to provide heat-protective filters and complicated mountings for them as was conventional in the prior art.

As is shown in the cross-sectional representation of FIGURE 2, the surgical illuminating head according to the present invention does not carry in its housing any bulky elements. The light radiators or outlets 42 have one converging lens 44 each of which may be pressed in a simple manner from conventional transparent plastics such as organic glass. Light sources for the individual lenses are the ends 48 of individual fiber bundles 50 which are supported and positioned by an intermediate member 46. The fiber bundles 50 extending to the individual light radiators 42 are combined above the housing 36 of the illuminating head in the flexible light conductor 16.

The distance which is assumed by the intermediate member 46 with respect to the spherical shell surface 40 is adjustable and an adjusting mechanism 52 is provided to control the spacing. This adjusting mechanism comprises, for example, a toothed rack 54 positioned at right angles to the plane of the intermediate member 46. The toothed rack 54 is in meshing engagement with an intermediate pinion 56 which is moved by a worm gear 58 connected with a knob 60.

When the knob 60 is turned clockwise or anti-clockwise, the intermediate member 46 is displaced in either an upward or downward direction. This results in a change of the spacing of the ends 48 of the fiber bundles 50 with respect to the converging lenses 44.

The path of light rays originating at a predetermined normal position of the bundle ends 48 has been shown in dotted lines in FIGURE 2. The light rays passing from the fiber bundles 50 through their ends 48 are collected by the converging lenses 44 and refracted on to the operating area 62 as collimated light rays. If the distance of the intermediate member 46 from the spherical shell 40 is altered, the divergence angle below the lenses 44 will be opened because the ends 48 of the fiber bundles 50 are no longer positioned in the focal point of the respective converging lenses 44. The refracted or radiated light will be slightly divergent and the area or region illuminated on the operating table will become somewhat larger and will have a lower light intensity.

A fiber bundle 64 additionally branched off from the flexible light conductor 16 extends to a "light socket" 66 which is positioned laterally on the housing 36 of the illuminating head. The light socket 66 serves for the connection of additional light radiators or light conduits which may be supplied by the light socket 66 by way of the parent light conductor 64. The light socket 66 is covered when not in use. Depending upon the respective requirements, it is possible, of course, to provide several light sockets to one illuminating head housing.

A further fiberglass bundle 68 in the housing 36 of the illuminating head, as shown in dotted lines, serves for the transmission of an image from an image source such as a lens or scanner 70 to a receiver, such as an optical viewer, a camera or screen 72. The camera 72 may be a photographic camera, a movie camera or a television camera such as an iconoscope or a projection screen. A color television camera may, of course, also be connected to the fiber bundle 68.

The camera 72 is disposed in a closed or sealed housing 74 which, in the embodiment of FIGURE 2, is suspended from the ceiling 11 in the light source housing. The box 74 is easily accessible and may be closed or sealed in an explosion-proof manner. In addition to the camera 72, the box 74 contains the light sources. The flexible light conductor 16 is introduced into the box 74. The fiber bundles 50 and 64 which branch off from the common light conductor 16 are connected to a light transmitting device 78 by way of the light conductor 76, and the light-transmitting device 78 collects the total light of an incandescent lamp 80 and supplies it to the light conductor 76. The incandescent lamp 80 may be either a highpower light bulb or a quartz iodine lamp. The resultant heat is exhausted or dissipated from the box 74 by a fan (not shown) or in any other suitable manner. If the source of radiation 80 itself is not equipped with several filaments for emergencies or as a stand-by means, the light conductor 76 is connected, by way of a further light conductor 78, with another alternative source of radiation 80 (not shown) so that, in case of a breakdown of one light source 80, it is possible to automatically switch over to a stand-by reserve light source.

The fiber bundles 50 are additionally connected to a photoflash light 86 by way of a light conductor 82 and a light-introducing device, such as a photoflash light actuator 84, and the flash of the photoflash light 86 is guided into the operating area 62 by way of the flexible light conductor and the fiber bundles 50 if additional illumination for photographic purposes is required.

In all instances where structural limitations permit, the box 74 will be arranged in a separate and readily accessible room above the ceiling 11 as shown in FIGURE 3. In that case, there is no need to provide additional precautions to avoid the danger of an explosion of anesthetic gases since the box 74 may be completely sealed off from the operating room. The box 74 is readily accessible in the separate room and the resultant heat may be drawn off easily by suitable means.

FIGURE 3 also illustrates another embodiment of the novel surgical illuminating apparatus of the invention. This figure shows how the flexible light conductor or light conveying means 16 is guided over a self-winding winch or reel 88, which is spring loaded for return winding in a manner not shown and which assures that the flexible light conductor is tightly stretched at all times between joint 14 and the housing 36 of the illuminating head. The length of the light conductor depends upon the greatest possible distance which the housing 36 of the illuminating head may assume with respect to the swivel link or joint 14.

FIGURE 4 illustrates a modified illuminating head 90 differing from that of the circular housing 36 of FIGURES 1 and 2. The elongated housing 90 of the illuminating head of FIG. 4 is oriented in the longitudinal direction thereof above the operating table and parallel thereto. The suspension may be effected in the same manner as shown in FIGURES 1 to 3 or in any other manner desired. Converging lenses 44 are mounted on planar members or panes 92, preferably suspended on gimbals, and support the ends 48 of the fiber bundles 50 in a suitable manner and at the proper distance. The gimbal suspension or mounting of the panes 92 permits adjusting of each individual converging lens 44 in an appropriate manner. For example, lenses may be adjusted jointly by means of a common adjusting mechanism (such as described for example in the German patent 1,137,-703). Additionally, it is also possible to provide an adjusting mechanism with the aid of which all plates 92 may be adjusted or regulated individually so that, for example, several operating regions on the operating area 62 may be illuminated simultaneously.

It should be understood that it is not intended to limit the invention to the above-described forms, embodiments and details, and that the invention includes such other forms and modifications as are embraced in the scope of the appended claims.

What is claimed is:

1. Illuminating apparatus for illuminating an extended work area such as an area of the human body including a surgical incision, comprising:

housing means containing light source means;

light conducting means which is at least partly flexible and has input portions disposed adjacent said light source means in light receiving relation thereto;

mounting means separate from said housing means and movable with respect thereto;

light directing means mounted on said mounting means and disposed adjacent to output portions of said light conducting means in light reeciving relation thereto:

connecting means mounted on said mounting means and adapted to maintain the input end of further light conducting means in light receiving relation to output portions of said light conducting means which has input portions disposed adjacent said light source means in light receiving relation thereto; and positioning means outside said housing means for positioning said mounting means independently of the position of said housing means;

said further light conducting means supplying light to luminous implement means;

said light directing means, in cooperation with said light source means and said light conducting means, being adapted to cast useful working illumination upon said work area when positioned at least far enough from said work area so that said mounting means does not interfere with the vision or movements of one carrying out work in said working area.

2. Illuminating apparatus as claimed in claim 1 in which the interior of said housing means is sealed against the admission of explosive components from the atmosphere found in the neighborhood of said mounting means.

3. Illuminating apparatus as claimed in claim 1 in which said mounting means permits said light directing means to be tilted with respect to an axis of said housing means.

4. Illuminating apparatus as claimed in claim 1, in which said housing means contains camera means, and part of said light conducting means conducts an image of said work area from optical means mounted on said mounting means to said camera means.

5. Illuminating means as claimed in claim 1 in which said light directing means comprises a plurality of separate means arranged in an array and cooperating to jointly illuminate said work area.

6. Illuminating means as claimed in claim 1 in which said luminous implement means is a handlamp.

7. Illuminating means as claimed in claim 1 in which said luminous implement means is a cap lamp.

8. Illuminating means as claimed in claim 1 in which said luminous implement means is a surgical instrument.

9. Illuminating means as claimed in claim 8 in which said surgical instrument is an endoscope.

References Cited

UNITED STATES PATENTS

| | | |
|---|---|---|
| 1,286,590 | 12/1918 | Grether. |
| 2,227,861 | 1/1941 | Petrone. |
| 2,802,932 | 8/1957 | Lambert. |
| 3,010,013 | 11/1961 | Gunther et al. |
| 3,016,785 | 1/1962 | Kapany. |
| 3,278,738 | 10/1966 | Clark. |

NORTON ANSHER, *Primary Examiner.*

R. A. SCHROEDER, *Assistant Examiner.*